N. S. BORCH.
NODULIZING ORES.
APPLICATION FILED MAY 7, 1913.
1,123,672.
Patented Jan. 5, 1915.
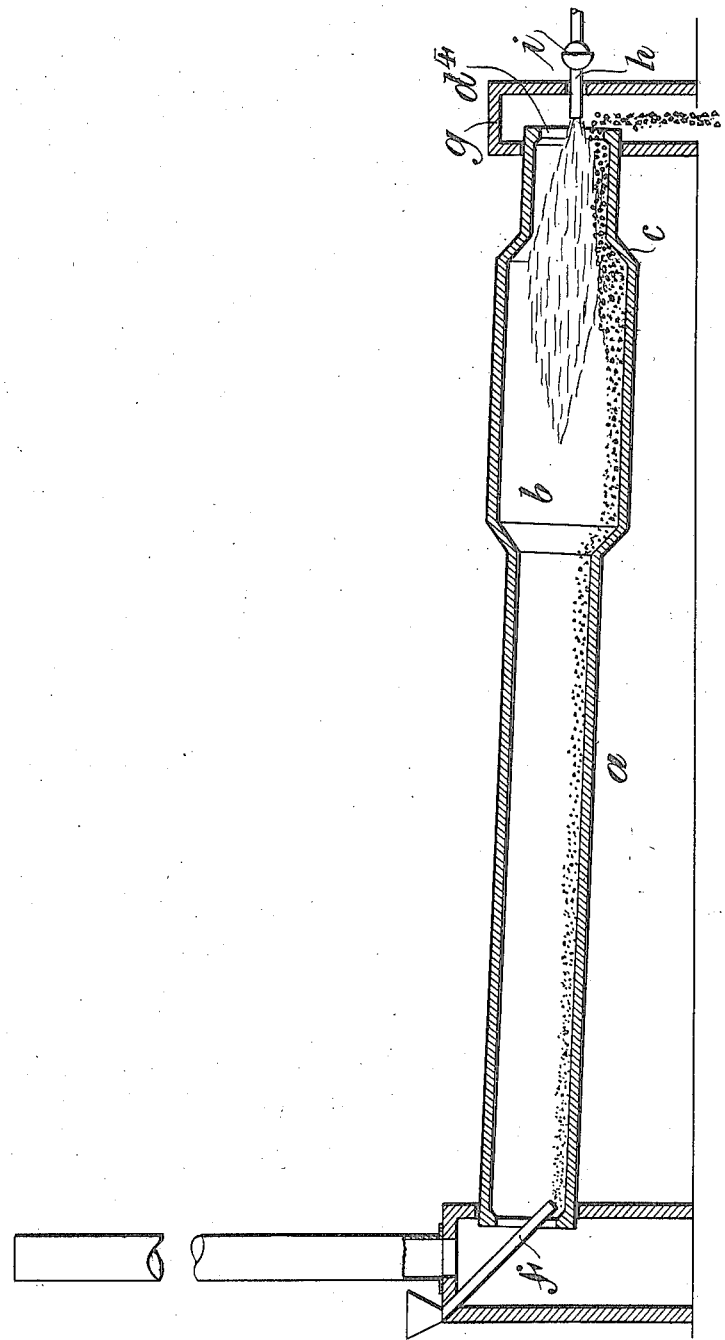
WITNESSES
INVENTOR
Niels S. Borch
BY
Redding, Greeley & Goodlett
ATTORNEYS

UNITED STATES PATENT OFFICE.

NIELS S. BORCH, OF COPENHAGEN, DENMARK.

NODULIZING ORES.

1,123,672. Specification of Letters Patent. Patented Jan. 5, 1915.

Application filed May 7, 1913. Serial No. 766,042.

*To all whom it may concern:*

Be it known that I, NIELS S. BORCH, a subject of the King of Denmark, residing in Copenhagen, Denmark, have invented certain new and useful Improvements in Nodulizing Ores, of which the following is a specification, reference being had to the accompanying drawing, which forms a part hereof.

This invention relates to the treatment of ores or metal bearing materials, such as earthy iron ore and flue dust, which cannot be treated successfully by the ordinary processes. Various attempts have been made to nodulize or agglomerate such ores or materials in rotary kilns, but such attempts have not proved economically successful hitherto because of the sticking of the material to the wall of the rotary kiln, when the material is softened, and the consequent formation of a ring within the kiln which increases so rapidly that the period of even fairly successful operation of the kiln becomes very short, while the production of nodules is far from satisfactory. It is found, in accordance with this invention, that the nodulizing of such materials can be carried on successfully in rotary kilns, without the formation of rings to such an extent as to make the operation uneconomical. To accomplish this result the material to be treated is subjected, in the kiln, to a reducing heat in which the temperature of the mass is raised nearly to what may be called the critical degree, that is, the degree of heat at which the material is softened sufficiently to agglomerate. During this heating of the material nearly but not quite to such critical degree, the material is shielded from the air which is blown into the kiln, not being subjected to oxidation thereby. When, however, the material has been subjected to the reducing heat and its temperature raised nearly to the critical degree, its temperature is raised quickly through the critical degree while the wall of the kiln is still at a temperature below the critical degree, whereby the agglomeration of the material and the formation of nodules is effected quickly and without injurious sticking of the material to the wall of the kiln. This rapid raising of the temperature of the mass through the critical degree is accomplished by subjecting the mass, already close to the critical degree, to an oxidizing flame or air current. By this oxidation much heat is liberated and a consequent strong rise in the temperature of the mass takes place, sufficient to soften the material and permit agglomeration to be effected. As this increase in temperature takes place in the mass of material itself and is due to chemical changes within the material, the temperature of the wall of the kiln will be lower than that of the material, so that there will be little tendency of the material to stick to the wall of the kiln, notwithstanding the agglomeration of the particles.

The invention will be further described hereinafter with reference to the accompanying drawing which illustrates, in sectional outline, a rotary kiln adapted for the practice of the invention.

The kiln $a$ is constructed substantially as usual, but is formed, near its lower or discharge end, with an enlargement $b$ the lower end $c$ of which forms a protection or shield as hereinafter described. At its discharge end it may also be provided with a further slight reduction, as at $d^4$. The kiln is further provided at its upper end with suitable feeding means indicated at $f$ and at its lower end with a suitable hood $g$ and with means, indicated by the nozzle $h$, for introducing fuel mixed with air or air alone as may be required. This nozzle is preferably mounted on a ball joint $i$ so that the direction of the flame or of the current of air within the kiln may be controlled.

In carrying out the invention in a kiln such as that described the ore to be treated, such as earthy iron ore or flue dust, mixed with a suitable proportion of carbon, usually ten to twelve percentum of powdered coal or coke, is fed into the kiln at its upper end in the usual manner. At the same time, in the beginning of the operation, a flame, preferably of coal dust, is discharged into the lower end of the kiln. The introduction of the flame is continued until such time as the proper temperature in the kiln is attained, when the introduction of fuel may be stopped and a supply of air alone continued, since the inflammable gases which are given off by the mixture of ore and coal or coke during the reducing process burn in the upper part of the kiln, in contact with the air supplied through the nozzle and furnish sufficient heat to continue the reducing process without additional fuel. It has been found that it is generally sufficient to continue the introduction of fuel through the nozzle for about fifteen to thirty minutes and that the operation may then be continued without the introduction of fuel for a period of four to six hours before it becomes desirable to introduce fuel through the nozzle again. The feeding of the ore, mixed with powdered coal or coke, is continued, however, without interruption. As the ore moves from the feeding end of the kiln toward the discharge end it is raised in temperature and subjected to a reducing process. As the reduction of the ore approaches completion and the temperature of the mass rises nearly to the critical temperature at which the softening and sticking will take place, the raising of the temperature through the critical degree is prevented or delayed by preventing contact of the oxidizing portion of the flame or air from the nozzle with the heated mass until the temperature of the forward portion of the mass can be raised suddenly through the critical degree. This is accomplished most conveniently by providing the kiln with an enlargement, such as that indicated at $b$, into which the material is delivered in its passage through the kiln and in which it remains, during the final reducing and heating, out of contact with the flame or blast of air from the nozzle.

It is preferably to provide the kiln with an enlargement, as indicated, but obviously the essential thing, so far as the construction of the kiln is concerned, is the provision of the shoulder $c$ which protects or shields the material before it comes into contact with the flame or air blast until the material, having been raised nearly to the critical degree, passes over the shoulder $c$ or the mass of material held by the shoulder and is exposed suddenly to the oxidizing portion of the flame or to the air. The oxidation of the already reduced and highly heated material develops a heat which is sufficient not only to continue the operation of the kiln for a considerable time without the further supply of fuel to the nozzle, but also to raise the mass suddenly through the critical temperature to that degree of temperature which is necessary for the softening and consequent agglomeration of nodulization of the agglomerated particles. This sudden development of heat, being due to chemical changes within the material, takes place within the material itself and without a corresponding increase in the temperature of the wall of the kiln. Consequently the temperature of the wall of the kiln at this point, that is, at the throat of the kiln, is considerably lower than that of the material itself. The result is that the particles of the material will stick to each other without any strong tendency to stick to the wall of the kiln. The nodules thus formed by the agglomerated material will roll toward the mouth of the kiln without sticking to the shell and without the formation of the ring which has heretofore rapidly closed the opening through the kiln and made the process of nodulizing in rotary kilns uneconomical and impracticable. It may be desirable to retard slightly, as by a shoulder $d$ at the mouth of the kiln, the discharge of nodules in order that they may become completely agglomerated. It will be seen further that as the introduction of fuel through the nozzle is necessary only at wide intervals of time, the necessary working heat being maintained meanwhile in the manner already described, the total quantity of fuel required is very small. It has been found in some instances, as in the treatment of flue dust, that the necessary quantity of fuel is from one to two percentum only of the weight of the resulting nodulized material.

It will be understood that the invention can be practised in a rotary kiln of any suitable character.

I claim as my invention:

1. The process of nodulizing ores in rotary kilns which consists in raising the temperature of the mass in a reducing heat nearly to the critical temperature and then subjecting the mass to an oxidizing action, whereby the temperature of the mass is raised suddenly through the degree required for nodulization without a corresponding rise in the temperature of the wall of the kiln.

2. The process of nodulizing ores in rotary kilns which consists in mixing the material to be treated with carbonaceous material, raising the temperature of the mass in a reducing heat nearly to the critical temperature and then subjecting the mass to an oxidizing action, whereby the temperature of the mass is raised suddenly through the degree required for nodulization.

3. The process of nodulizing ores in rotary kilns which consists in raising the temperature of the mass nearly to the critical temperature of nodulization out of contact with an oxidizing agent and then subjecting the mass to the action of an oxidizing agent, whereby the temperature of the mass is raised suddenly through the degree required for nodulization.

4. The process of nodulizing ores in rotary kilns which consists in causing the material to travel progressively through the kiln, subjecting the material during the first portion of its travel to a reducing heat until its temperature is raised nearly to the critical temperature of nodulization, and then subjecting the mass in its further travel to the action of an oxidizing agent, whereby the temperature of the mass is raised suddenly through the degree required for nodulization.

This specification signed and witnessed this 22nd day of April A. D. 1913.

NIELS S. BORCH.

Signed in the presence of—
WILLIAM GARZIULO,
NICOLO GUSNIEU.